(12) United States Patent
Warner et al.

(10) Patent No.: US 9,302,518 B2
(45) Date of Patent: Apr. 5, 2016

(54) SYSTEM FOR DETECTING INOPERATIVE INKJETS IN THREE-DIMENSIONAL OBJECT PRINTING USING AN OPTICAL SENSOR AND REVERSIBLE THERMAL SUBSTRATES

(71) Applicant: Xerox Corporation, Norwalk, CT (US)

(72) Inventors: Victoria L. Warner, Caledonia, NY (US); James L. Giacobbi, Penfield, NY (US); Matthew R. McLaughlin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 53 days.

(21) Appl. No.: 14/231,301

(22) Filed: Mar. 31, 2014

(65) Prior Publication Data

US 2015/0273913 A1  Oct. 1, 2015

(51) Int. Cl.
| | | |
|---|---|---|
| *B41J 29/393* | (2006.01) | |
| *B29C 67/00* | (2006.01) | |
| *B41J 2/165* | (2006.01) | |
| *B41J 2/21* | (2006.01) | |
| *B41J 29/17* | (2006.01) | |
| *B33Y 30/00* | (2015.01) | |
| *B41J 2/175* | (2006.01) | |
| *B41J 29/02* | (2006.01) | |
| *B41J 2/045* | (2006.01) | |

(52) U.S. Cl.
CPC ........... *B41J 29/393* (2013.01); *B29C 67/0059* (2013.01); *B33Y 30/00* (2014.12); *B41J 2/16579* (2013.01); *B41J 2/17509* (2013.01); *B41J 2/2142* (2013.01); *B41J 29/02* (2013.01); *B41J 29/17* (2013.01); *B41J 2/0451* (2013.01)

(58) Field of Classification Search
None
See application file for complete search history.

(56) References Cited

U.S. PATENT DOCUMENTS

| | | | |
|---|---|---|---|
| 2004/0012112 A1 | 1/2004 | Davidson et al. | |
| 2006/0111807 A1 | 5/2006 | Gothait et al. | |
| 2006/0141145 A1 | 6/2006 | Davidson et al. | |
| 2009/0011066 A1 | 1/2009 | Davidson et al. | |
| 2010/0060708 A1* | 3/2010 | Iwazaki | B41J 2/32 347/218 |
| 2010/0151136 A1 | 6/2010 | Davidson et al. | |
| 2010/0328383 A1* | 12/2010 | Yoshikawa | B41J 2/2142 347/12 |
| 2011/0279507 A1* | 11/2011 | Castillo | B41J 11/0095 347/16 |

FOREIGN PATENT DOCUMENTS

WO  03/026876 A2  4/2003

* cited by examiner

*Primary Examiner* — Lisa M Solomon
(74) *Attorney, Agent, or Firm* — Maginot Moore & Beck LLP

(57) ABSTRACT

An apparatus detects inoperative inkjets during printing of three-dimensional objects. The apparatus includes a reversible thermal substrate that changes optical density in areas where material drops are ejected onto the substrate. An optical sensor generates image data of the substrate after material drops are ejected onto the substrate and these image data are analyzed to identify inoperative inkjets.

5 Claims, 4 Drawing Sheets

SYSTEM FOR DETECTING INOPERATIVE INKJETS IN THREE-DIMENSIONAL OBJECT PRINTING USING AN OPTICAL SENSOR AND REVERSIBLE THERMAL SUBSTRATES

TECHNICAL FIELD

The device disclosed in this document relates to printers that produce three-dimensional objects and, more particularly, to accurate detection of inoperative inkjets in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the drops of material that form the objects. During printing of an object, one or more inkjets can deteriorate by ejecting the material at an angle, rather than normal, to the printhead, ejecting drops that are smaller than an inkjet should eject, or by failing to eject any drop at all. An inkjet suffering from any of these operational deficiencies is known as an inoperative inkjet. If the operational status of one or more inkjets deteriorates during object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. An apparatus that enables detection of inoperative inkjets while printing would enable restorative procedures to be applied during object printing so a properly formed object can be produced. In this manner, product yield for the printer is improved and its printing is more efficient. The apparatus should be able to detect inoperative inkjets that eject a multitude of printing materials, such as clear, colored, translucent, phosphorescent, and waxy materials.

SUMMARY

An apparatus that enables inoperative inkjet detection in three-dimensional printers includes a thermal substrate, an optical sensor configured to generate data of a surface of the thermal substrate, a transport configured to move the thermal substrate to a position opposite the optical sensor to enable the optical sensor to generate image data of drops on the thermal substrate, and a controller operatively connected to the transport and the optical sensor, the controller being configured to operate the transport to move the thermal substrate to the position opposite the optical sensor, to operate the optical sensor to generate image data of the thermal substrate after drops of material have been ejected onto the thermal substrate by inkjets in a printhead, and to identify inoperative inkjets in the printhead that ejected the drops with reference to the image data received from the optical sensor that corresponds to the drops of material on the thermal substrate.

A printer that incorporates the apparatus for detecting inoperative inkjets includes a printhead configured with inkjets to eject drops of material, a thermal substrate configured to move to a position opposite the printhead to receive drops ejected from the printhead, an optical sensor configured to generate data corresponding to the drops on the thermal substrate, a transport configured to move the substrate to a position opposite the optical sensor to enable the optical sensor to generate image data of the drops on the thermal substrate, and a controller operatively connected to the transport, the optical sensor, and the printhead, the controller being configured to operate the printhead to eject a predetermined number of drops from each inkjet onto the thermal substrate while the thermal substrate remains stationary at the position opposite the printhead to enable the predetermined number of drops to form a test dot for each inkjet on the thermal substrate, to operate the optical sensor to generate image data of the thermal substrate, and to identify inoperative inkjets in the printhead with reference to the image data received from the optical sensor that corresponds to the test dots on the thermal substrate.

BRIEF DESCRIPTION OF THE DRAWINGS

The foregoing aspects and other features of an apparatus or printer that detects inoperative inkjets during three-dimensional printing are explained in the following description, taken in connection with the accompanying drawings.

DETAILED DESCRIPTION

Figure 1:
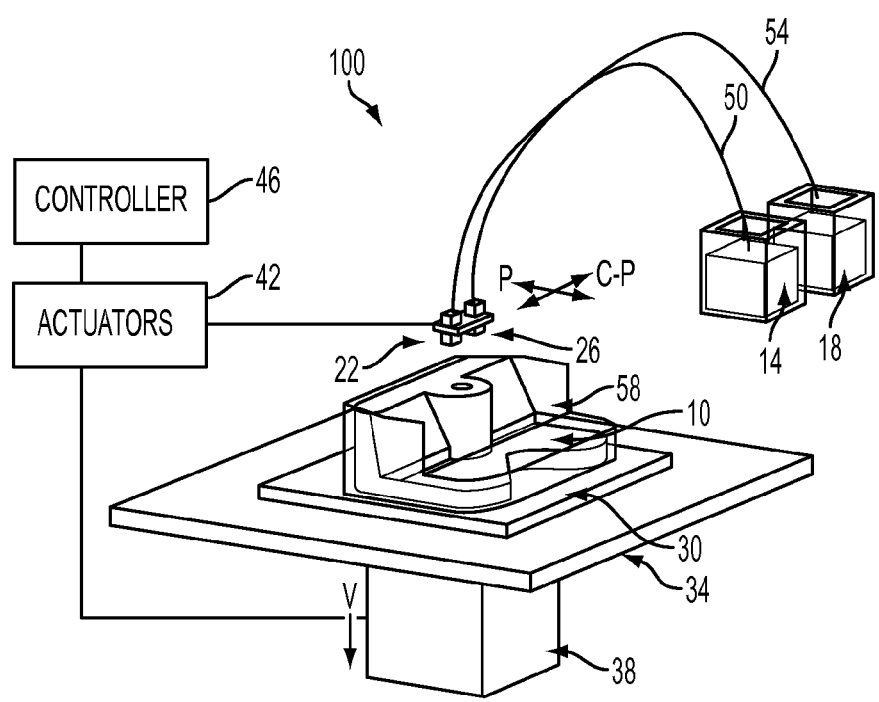
FIG. 1 is a perspective view of a three-dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional printer" refers to any device that ejects material with reference to image data of an object to form a three-dimensional object. The printer 100 includes a support material reservoir 14, a build material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both inkjet printheads are operated by the controller 46 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
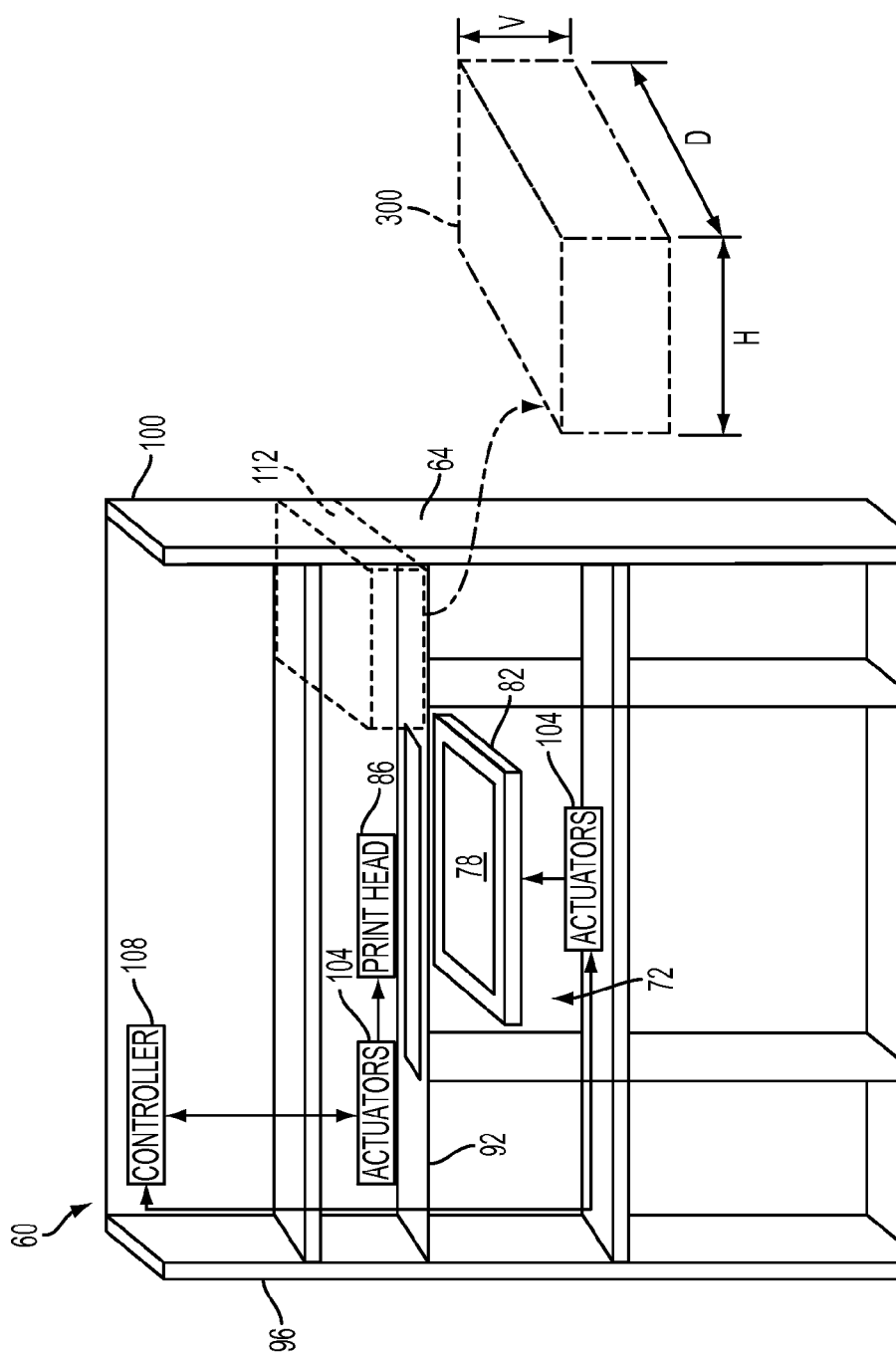
FIG. 2 is front view of a three-dimensional object printer having a housing that depicts a space within the housing for a module that enables inoperative inkjets in the printhead to be detected during a printing operation.

A three-dimensional object printer having a housing is shown in FIG. 2. That printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the inkjets in the printhead 86 and vertically moving the support platform 82 and horizontally moving the printhead 86 on the member 92, a three-dimensional object can be formed on the planar support 78.

The area 112 outlined in dashes in FIG. 2 identifies the placement of a module that uses thermal film to detect inoperative inkjets in the printer 60. As noted above, if an inkjet fails during printing of an object by either completely or partially failing to eject material or by errantly ejecting material in a skewed direction, the object being produced is malformed. Currently, this malformation cannot be detected until production of the object is finished. By using area 112 for optically sensing inoperative inkjets, printer 60 can be configured to detect inoperative inkjets during object production as described more fully below. Some components within the module 300 can move in the horizontal direction H, depth direction D, and vertical direction V as shown in the figure.

Figure 3:
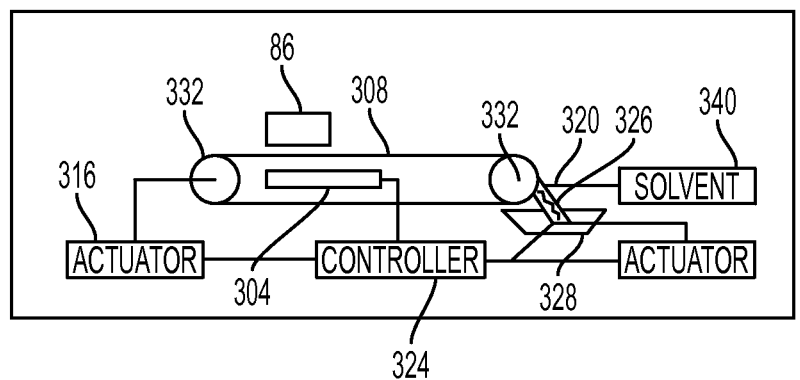
FIG. 3 is a side view of a module for detecting inoperative inkjets that fits in the space shown in FIG. 2.

One embodiment of a module that detects inoperative inkjets ejecting clear materials during object printing is shown in the block diagram of FIG. 3. The module 300 is configured to fit within area 112 of printer 60. The module 300 includes an optical sensor 304, a thermal substrate 308, one or more actuators 316, a controller 324, a cleaning member 320, and a waste receptacle 328. The substrate 308 is configured as an endless belt entrained about two rollers 332. The optical sensor 304 is as wide as the belt, although the optical sensor 304 could be narrower than the belt if it is configured for bidirectional movement with an actuator in the direction of the belt width. The controller 324 is operatively connected to the actuators 316 to drive at least one of the rollers 332 to rotate the endless belt of substrate 308 about the optical sensor 304 and to sweep the substrate 308 with the cleaning member 320.

The thermal substrate 308 is a planar member made of a material that supports the build material and the support material ejected from the printhead 86 and that changes color in response to heat contained within the build material or support material. These materials increase in optical density with reference to a known function of optical density per unit of heat energy input to the material of the thermal substrate. The areas darkened by the heat return to their original color when the heat energy dissipates. For example, the planar substrates could be a film manufactured by LCR Hallcrest of Glenview, Ill. See http://www.hallcrest.com/digitempsc.cfm for exemplary materials. As used in this document, a thermal substrate is one that changes an optical density of an area on the substrate per unit of heat energy input to the area. A reversible thermal substrate, as used in this document, refers to a thermal substrate that reverts to an optical density that an area of the substrate had prior to heat energy being input to the area.

A cleaning member 320 is mounted to a support member that is operatively connected to an actuator. As described below, the controller 324 operates the actuator to move the support member to engage the substrate 332 with the cleaning member 320. This action sweeps build and support material from the substrate 308 into the waste receptacle 328 to renew the surface of substrate 308 for another test pattern printing. The cleaning member 340 can include a supply of cleaning solvent 340 that controller 324 can operate to spread cleaning solvent onto the substrate before the cleaning member sweeps the substrate. The cleaning solvent chemically interacts with the build and support material to loosen the material before the cleaning member encounters it. Additionally or alternatively, a heater 326 can be positioned with respect to the cleaning member 320 to heat the build and support material before the cleaning member sweeps the substrate 308. In other embodiments, no cleaning member is provided and the controller advances the substrate 332 by an amount that enables a test pattern to be printed and then imaged with the sensor 304. The controller 324 detects when the belt 308 is approaching one full revolution and it then generates a signal that indicates the belt 308 needs changing.

Figure 4:
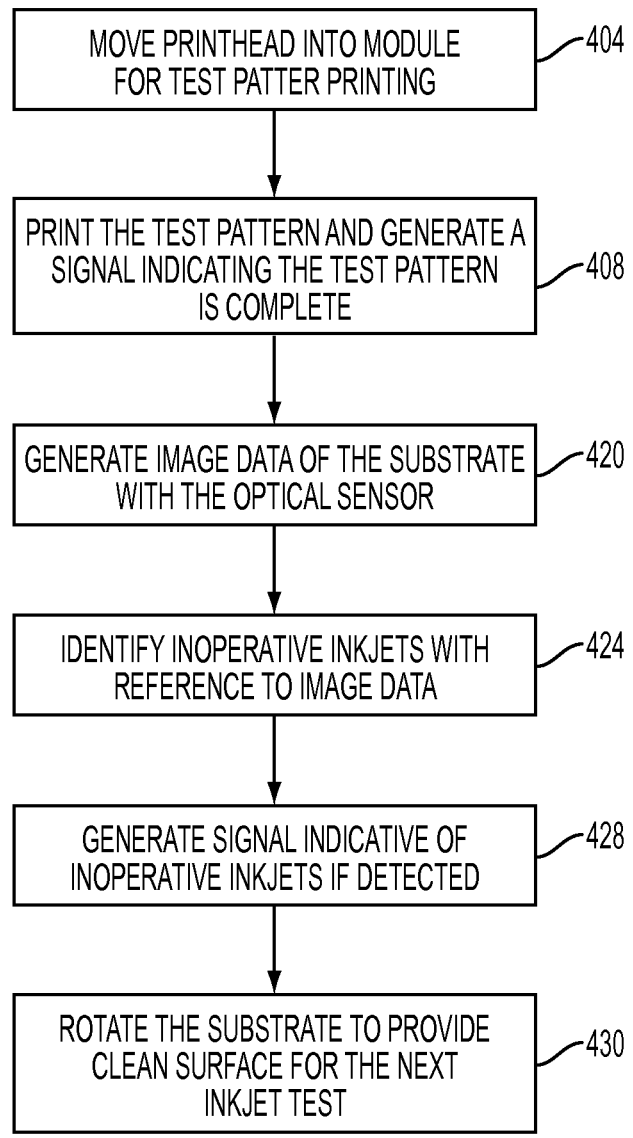
FIG. 4 is a flow diagram of a method for operating the module of FIG. 3.

A method of operating a printer that produces three-dimensional objects is shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 324 noted above can be such a controller or processor. Alternatively, the controller 324 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 where controller 108 operates the printhead 86 to eject build and support material onto the substrate 308, which is stationary while being printed (block 404). In one embodiment, each inkjet in the printhead is repetitively operated to form a pile of material, also called a test dot, on a portion of the substrate 308 opposite the inkjet. After the test pattern is printed, controller 108 generates a signal to controller 324 that indicates the material ejections forming a test pattern are completed (block 408). In response to the signal from controller 108, controller 324 operates the optical sensor 304 to generate image data of the substrate 308 (block 420). The operation of the sensor 304 occurs almost immediately after the test pattern is printed since the heat of the ejected material and its effect on the substrate 332 begins to dissipate as the material leaves the inkjets. The electrical signals generated by the sensor 304 are image data that are analyzed with reference to expected positions for the build and support material used to form the test pattern to identify inoperative inkjets (block 424) and, if inoperative inkjets are identified, a signal indicative of the defective printhead is generated for the operator of the printer (block 428). The operator can then take appropriate action. The controller 324 continues to operate the actuator 316 to rotate the substrate 308 to prepare a clean portion for a next inkjet test (block 430). As explained above, the cleaning can be performed by engaging the substrate 308 with the cleaning member 320 to remove material from the substrate as the substrate moves past the cleaning member or by advancing the substrate to provide a clean portion of the substrate for the next test pattern. If material is removed by the member 320, it is collected in the waste receptacle 328, which can be removed from the printer from time to time and either replaced or emptied and then re-installed.

While the embodiments discussed above are within a printer that forms three-dimensional objects, thermal substrates and the system that detects inoperative inkjets from the effects that the heat of the ejected material has on such substrates can also be used in two dimensional document printing systems, particularly those that use clear inks. In such systems, a thermal substrate, from time to time, passes by the printhead to be printed, imaged, and analyzed to identify inoperative inkjets. Likewise, printheads ejecting clear ink onto a moving web or an imaging member, such as a drum, can be moved opposite a thermal substrate for printing and detection of inoperative inkjets. Thus, as used in this document, the word "material" refers to substances that can be used to form three-dimensional objects as well as inks used in document printing.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
   a printhead configured with inkjets to eject drops of material;
   an endless belt of reversible thermal substrate entrained about a plurality of rollers, the endless belt being configured to move to a position opposite the printhead to enable the reversible thermal substrate to receive drops ejected from the printhead;
   an optical sensor configured to generate data corresponding to the drops on the thermal substrate;
   a transport configured to move the substrate to a position opposite the optical sensor to enable the optical sensor to generate image data of the drops on the thermal substrate;
   a cleaning member; and
   a controller operatively connected to the transport, the optical sensor, and the printhead, the controller being configured to operate an actuator to move the endless belt of reversible thermal substrate about the plurality of rollers, to operate the printhead to eject a predetermined number of drops from each inkjet onto the thermal substrate while the thermal substrate remains stationary at the position opposite the printhead to enable the predetermined number of drops to form a test dot for each inkjet on the thermal substrate, to operate the optical sensor to generate image data of the thermal substrate, to identify inoperative inkjets in the printhead with reference to the image data received from the optical sensor that corresponds to the test dots on the thermal substrate, and to operate the cleaning member to engage the reversible thermal substrate as the endless belt of reversible thermal substrate moves past the cleaning member.

2. The printer of claim 1 further comprising:
   a supply of cleaning solvent; and
   the controller is further configured to operate the supply of cleaning solvent to apply cleaning solvent to the reversible thermal substrate before the cleaning member engages the reversible thermal substrate.

3. The printer of claim 1, the cleaning member further comprising:
   a heater configured to heat the reversible thermal substrate as the reversible thermal substrate moves past the cleaning member.

4. A printer comprising:
   a printhead configured with inkjets to eject drops of material;
   a reversible thermal substrate configured to move to a position opposite the printhead to receive drops ejected from the printhead;
   an optical sensor configured to generate data corresponding to the drops on the reversible thermal substrate, the optical sensor having a width that is wider than a width of the reversible thermal substrate;
   a transport configured to move the substrate to a position opposite the optical sensor to enable the optical sensor to generate image data of the drops on the reversible thermal substrate; and a controller operatively connected to the transport, the optical sensor, and the printhead, the controller being configured to operate the printhead to eject a predetermined number of drops from each inkjet onto the reversible thermal substrate while the reversible thermal substrate remains stationary at the position opposite the printhead to enable the predetermined number of drops to form a test dot for each inkjet on the reversible thermal substrate, to operate the optical sensor to generate image data of the reversible thermal substrate, and to identify inoperative inkjets in the printhead with reference to the image data received from the optical sensor that corresponds to the test dots on the reversible thermal substrate.

5. A printer comprising:

a printhead configured with inkjets to eject drops of material;

a reversible thermal substrate configured to move to a position opposite the printhead to receive drops ejected from the printhead;

an optical sensor configured to generate data corresponding to the drops on the reversible thermal substrate, the optical sensor being positioned on a side of the reversible thermal substrate that is opposite a side of the reversible thermal substrate that receives drops from the printhead;

a transport configured to move the substrate to a position opposite the optical sensor to enable the optical sensor to generate image data of the drops on the reversible thermal substrate; and a controller operatively connected to the transport, the optical sensor, and the printhead, the controller being configured to operate the printhead to eject a predetermined number of drops from each inkjet onto the reversible thermal substrate while the reversible thermal substrate remains stationary at the position opposite the printhead to enable the predetermined number of drops to form a test dot for each inkjet on the reversible thermal substrate, to operate the optical sensor to generate image data of the reversible thermal substrate, and to identify inoperative inkjets in the printhead with reference to the image data received from the optical sensor that corresponds to the test dots on the reversible thermal substrate.

* * * * *